United States Patent [19]

Logan

[11] 4,218,156
[45] Aug. 19, 1980

[54] VARIABLE LENGTH LINKAGE

[75] Inventor: Scott R. Logan, Danvers, Mass.

[73] Assignee: The United States of America as represented by the Secretary of the Army, Washington, D.C.

[21] Appl. No.: 34,062

[22] Filed: Apr. 27, 1979

[51] Int. Cl.² ............................................. F16B 39/00
[52] U.S. Cl. .................................... 403/320; 74/586; 151/29
[58] Field of Search .................. 74/586; 403/320, 343, 403/46, 44, 43, 47, 45; 151/29

[56] References Cited

U.S. PATENT DOCUMENTS

| 197,762 | 12/1877 | Calhoun | 151/29 |
| 879,384 | 2/1908 | Hillmon | 74/586 X |
| 3,582,118 | 6/1971 | Hogan | 403/320 |
| 3,960,359 | 6/1976 | Svahn | 403/43 X |
| 3,989,394 | 11/1976 | Ellis | 403/320 X |

Primary Examiner—Andrew V. Kundrat
Attorney, Agent, or Firm—Nathan Edelberg; Robert P. Gibson; Norman L. Wilson, Jr.

[57] ABSTRACT

A mechanical linkage is disclosed having male and female mating portions, said linkage being adjustable to a selected length and said male member carrying a locking means for simultaneously engaging the male and female members and for locking them in relative mated position.

3 Claims, 4 Drawing Figures

VARIABLE LENGTH LINKAGE

This invention relates to a variable length linkage.

Variable geometry axial flow compressors are used in gas turbine engines. Compressors of this type include a casing and a rotor with stator and rotor blades. A mechanism is provided for angular adjustment of the stator blades. This adjustment is provided in response to movements of an actuator which movement is transmitted through a linkage assembly to said blades. In some compressors, the linkage assembly includes a lever arm but in others the linkage assembly includes a rotary crank shaft, bellcrank system or the like. In any case, other linkages connect the lever arm, rotary crank shaft, bellcrank system and so forth to unison rings which actuate the individual variable vane lever arms and pivotally adjust the stator blades.

In some compressors having a variable geometry linkage assembly with a rotary crank shaft, the variable geometry actuator is an integral part of the fuel control. A spherical bearing is provided at the end of an actuator piston rod for connection through a mechanical linkage to a spherical bearing on an input crank arm of the rotary crank shaft. Emanating from this crank shaft are a number of other crank arms which through other mechanical linkages are connected to the unison rings controlling the angle of the stator blades. Thus, the motion of the rod end bearing is transmitted to the variable geometry linkage assembly by means of the aforementioned mechanical linkage.

For optimization of compressor variable geometry schedules and for other special test purposes requiring off schedule operation, it would be desirable if the mechanical linkage connecting the piston rod to the linkage assembly were easily adjustable in length without taking the linkage apart. Moreover, it would also be desirable if the mechanical linkage resisted changes in length when it is adjusted to a selected length and torqued by either of its supporting bearings.

Among the several objects of the present invention may be noted the provision of a variable length mechanical linkage for connecting a variable geometry actuator to a variable geometry linkage assembly in a gas turbine engine. Another object is to provide a variable length mechanical linkage for use wherever the specifications disallow a conventional turnbuckle assembly with a lockwire. Other objects and features will be in part apparent and in part pointed out hereinafter.

The invention accordingly comprises the constructions hereinafter described, the scope of the invention being indicated in the subjoined claims. In the accompanying drawings, in which one of various possible embodiments of the invention is illustrated, corresponding reference characters refer to corresponding parts, and in which:

Figure 1:
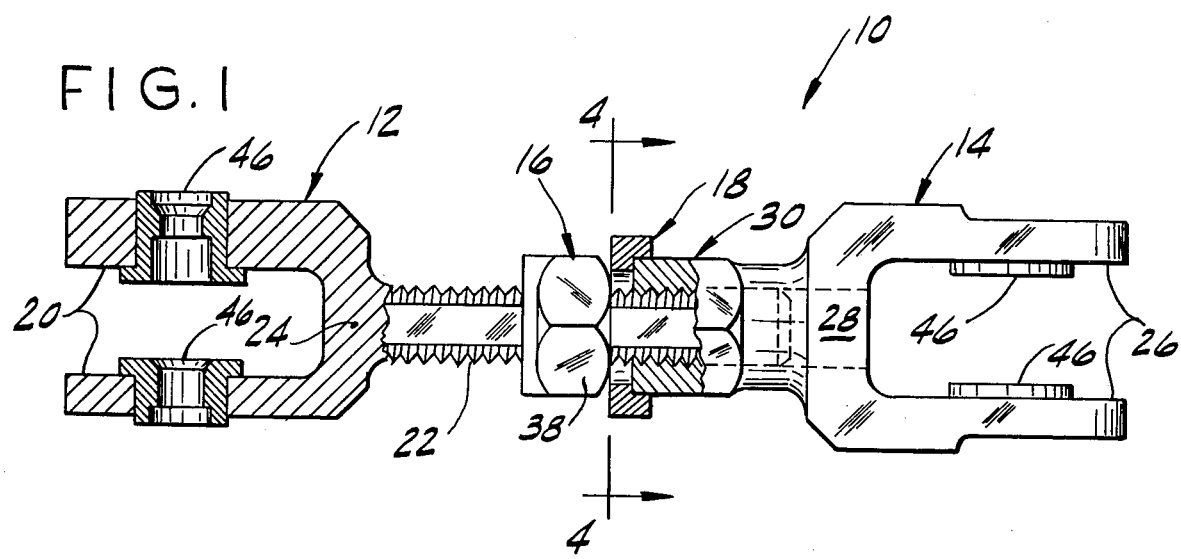
FIG. 1 is a side elevational view, partly in section, of a variable length linkage including a locknut and a keeper constructed in accordance with the present invention.
Figure 2:
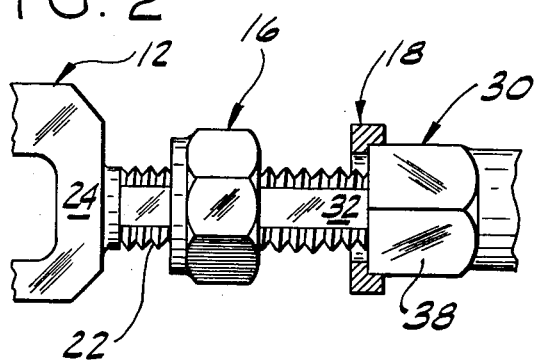
FIG. 2 is a fragmentary view of the linkage assembly shown in FIG. 1 but with the locknut in moved condition.
Figure 4:
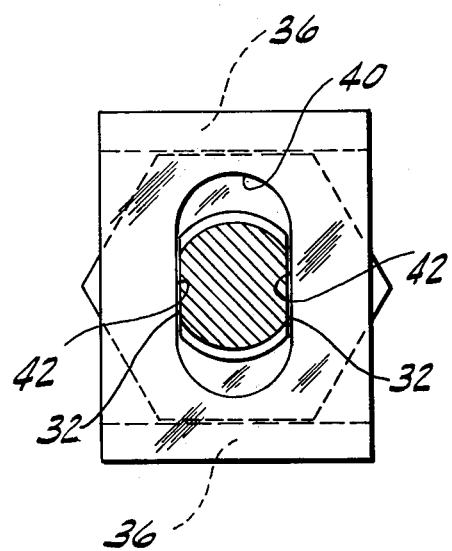

Referring to the drawings more particularly by reference character, reference numeral 10 refers to a variable length linkage in accordance with the present invention. As best seen in FIG. 1, linkage 10 includes first and second clevises 12 and 14, respectively, a locknut 16 and a keeper 18. Clevis 12 has a pair of legs 20 and a threaded rod 22 joined on opposite sides of a bridge 24. Other clevis 14 also has a pair of legs 26 joined by a bridge 28 but with a knob or boss 30 formed on the opposite side thereof. Boss 30 is tapped for receipt of threaded rod 22 which, as best seen in FIG. 4, has a pair of diametrically opposed flat sides 32 running the length thereof.

Keeper 18 is U-shaped in cross-section and comprises a flat plate 34 with a pair of flanges 36 upstanding from opposite side edges thereof to form fingers which slip over and engage flats 38 formed about the outer margin of boss 30 which is polygonal in cross-section. The flats are formed as a plurality of flat surfaces about the periphery thereof. As shown in the drawings, boss 30 is hexagonal in cross-section but any number of flats could be used. An oval slot 40 is centrally formed in plate 34 with its principal axis normal to flanges 36 when the number of flats on boss 30 is even. As best seen in FIG. 4, slot 40 is flattened at 42 to provide a large bearing surface for engagement with the aforementioned flattened thread 32 formed on opposite sides of threaded rod 22. On highly loaded or critical devices such as aircraft, it is highly desirable to avoid stress concentrations. And, for this reason, the bearing surface described above is thus preferred.

Figure 3:
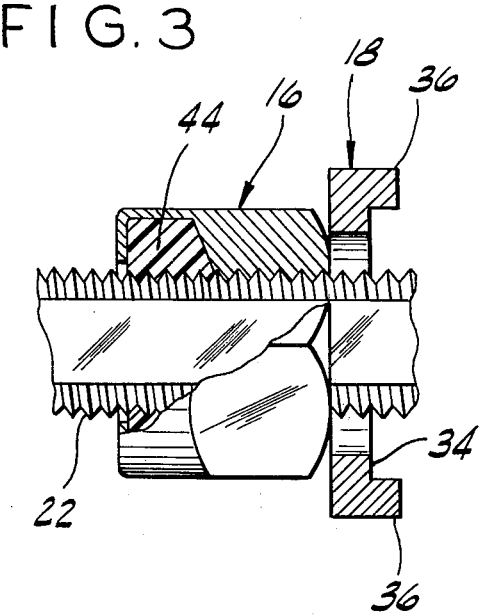
FIG. 3 is an enlarged side elevational view, partly in section, of the locknut and keeper shown in FIG. 1; and, FIG. 4 is an enlarged view taken along line 4—4 in FIG. 1 showing the keeper.

In use, locknut 16 is threaded on rod 22 and keeper 18 is slipped thereon. In the construction shown in FIG. 3, locknut 16 has a plastic insert 44 in that end of the nut which is threaded on rod 22 first. When variable length linkage 10 is adjusted to a selected length, as shown in FIGS. 1 and 3, locknut 16 is torqued against keeper 18. Although it is somewhat inconvenient to have the locking portion of the nut threaded on the rod first, this arrangement permits the use of a standard nut yet provides an all-metal load carrying area at the interface between the locknut and the keeper. Other commercially available locknuts can be substituted for the one illustrated in the drawings. For example, the locking portion of the nut can be in the center, rather than at the end so that the nut can be threaded freely from either side.

With locknut 16 threaded on rod 22, and keeper 18 installed axially on rod 22, the forward end of rod 22 is threaded into boss 30. Since keeper 18 is not free to rotate on rod 22, the length of linkage 10 can be adjusted in one-flat intervals with respect to boss 30. Finer adjustments in length can be had by increasing the number of flats 38. When the over all length of linkage 10 is approximately that desired, keeper 18 is slid down rod 22 and clevis 12 twisted with respect to clevis 14 such that flanges 36 slip over an opposing pair of flats 38 on boss 30. Locknut 16 is then tightened against keeper 18. So assembled, clevis 12 is anti-rotation locked with respect to clevis 14. Hence even though clevises 12 and 14 are torqued at bearings 46, linkage 10 will resist changes in length.

In view of the above, it will be seen that the several objects of the present invention are achieved and other advantageous results attained. As various changes could be made in the above constructions without departing from the scope of the invention, it is intended that all matter contained in the above description or shown in the accompanying drawings shall be interpreted as illustrative and not in a limiting sense. For example, linkage 10 is illustrated as having a clevis at opposite ends. However, the male portion bearing rod 22 and the female portion bearing knob 30 may be provided with other suitable rod end connectors and may be used wherever such linkages are desirable. In those constructions wherein the connection between the rod end connector and its supporting bearing cannot be made at all angles, the linkage will be adjustable in less than one-flat intervals. For example, if the connection can be made in only one position, then linkage 10 is adjustable at each 360 degree rotation of rod 22 with respect to knob 30. Other such changes will be apparent to those skilled in the art as within the scope of the present invention.

What is claimed is:

1. An adjustable lever arm having an externally threaded rod threadably connected at one end to an internally threaded rod, each rod having a rod end spherical bearing connector at its opposite end, lever arm adjustment means including an enlarged knob on the end of the internally threaded rod end which is regular polygonal in cross-section, said knob having an even number of flat surfaces about the periphery thereof so that the rod can be rotated thereby, the number of flat surfaces determining the degree of rotation of said knob and thereby the length of the lever arm, locking means including flattened opposite sides of the externally threaded rod, a locknut having a friction insert and a keeper slideable on the flattened sides, said keeper comprising a plate with a pair of flanges along opposite side edges thereof and an elongated slot with its principal axis normal to said flanges, said flanges being spaced apart such that they pass over opposing flat surfaces of the knob and such that the keeper is restrained thereby from rotation with respect to said knob, said elongated slot being flat along opposite side edges thereof, said side edges being spaced so that the flat sides of the slot pass over the flattened sides of the threaded rod and so that the keeper, while slideable on the flattened sides, is restrained thereby from rotation with respect to said threaded rod, and can be locked in place by said locknut.

2. The linkage according to claim 1 wherein said rod end connectors comprises a pair of clevises.

3. The linkage according to claim 2 wherein each of said clevises has a bridge and wherein the threaded rod is joined to one of said bridges and wherein the knob is joined to the other of said bridges.

* * * * *